United States Patent
Goudarzian et al.

(10) Patent No.: US 11,130,621 B2
(45) Date of Patent: Sep. 28, 2021

(54) PISTON BOX

(71) Applicant: Amazon Technologies, Inc., Seattle, WA (US)

(72) Inventors: Kaveh Goudarzian, Seattle, WA (US); Chad Hockin, Seattle, WA (US); Michael Lin, Seattle, WA (US); Daniel Wang, Kirkland, WA (US); Frank Michael Marceau, Vashon, WA (US)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 16/559,436

(22) Filed: Sep. 3, 2019

(65) Prior Publication Data

US 2019/0389642 A1 Dec. 26, 2019

Related U.S. Application Data

(62) Division of application No. 15/717,484, filed on Sep. 27, 2017, now Pat. No. 10,464,730.

(51) Int. Cl.
*B65D 81/05* (2006.01)
*G06Q 50/28* (2012.01)
(Continued)

(52) U.S. Cl.
CPC ............. *B65D 81/05* (2013.01); *B64D 1/14* (2013.01); *G06Q 10/083* (2013.01); *G06Q 50/28* (2013.01)

(58) Field of Classification Search
CPC .. B65D 81/05; B65D 81/052; B65D 81/1075; B65D 25/04; B65D 85/30;
(Continued)

(56) References Cited

U.S. PATENT DOCUMENTS 1,768,194 A * 6/1930 Donnell .................. B64D 1/02
206/521
2,495,486 A * 1/1950 Stevenson ............... B64D 1/02
244/138 A
(Continued)

FOREIGN PATENT DOCUMENTS

WO 2017019731 2/2017
WO WO-2017019731 A1 * 2/2017 ............. B64D 17/02

OTHER PUBLICATIONS

U.S. Appl. No. 15/717,484, "Non-Final Office Action", dated Mar. 21, 2019, 19 pages.
(Continued)

*Primary Examiner* — Mark T Le
(74) *Attorney, Agent, or Firm* — Kilpatrick Townsend & Stockton LLP

(57) ABSTRACT

A shock-absorbing package includes a box and a base. The box is configurable to enclose an item and has a box bottom panel. The base has a base bottom panel and defines a recess sized to accommodate a portion of the box including the box bottom panel. The base interfaces with the box in a transport configuration so that the box bottom panel is held separated from the base bottom panel and a volume of air is disposed between the base bottom panel and the box bottom panel. An impact force applied to the base bottom panel generated by dropping the shock-absorbing package onto a surface induces relative movement between the box and the base that expels air from the volume air and decelerates the box at a rate less than a desired maximum deceleration rate.

16 Claims, 8 Drawing Sheets

(51) Int. Cl.
  *G06Q 10/08* (2012.01)
  *B64D 1/14* (2006.01)

(58) Field of Classification Search
  CPC ........ B65D 88/1618; B64D 1/14; B64D 1/08; G06Q 50/28; G06Q 10/083
  See application file for complete search history.

(56) References Cited

U.S. PATENT DOCUMENTS

| | | | |
|---|---|---|---|
| 2,958,487 A * | 11/1960 | Fraebel | B64D 1/14 244/138 R |
| 3,050,278 A | 8/1962 | Gardner et al. | |
| 3,168,267 A | 2/1965 | Ferris | |
| 4,483,095 A | 11/1984 | Webinger | |
| 4,606,460 A | 8/1986 | Luray | |
| 4,681,303 A * | 7/1987 | Grassano | A01K 27/005 119/769 |
| 4,877,136 A | 10/1989 | Mizuno et al. | |
| 5,201,868 A | 4/1993 | Johnson | |
| 5,609,972 A * | 3/1997 | Kaschmitter | H01M 50/572 429/56 |
| 5,975,320 A * | 11/1999 | Bietzer | B65D 41/3404 215/254 |
| 6,170,689 B1 | 1/2001 | Flesher et al. | |
| 6,511,018 B1 * | 1/2003 | Parson | B64D 1/14 244/137.1 |
| 7,264,116 B2 | 9/2007 | Prentza | |
| 9,296,470 B1 * | 3/2016 | Moselage, III | F42B 12/58 |
| 9,412,280 B1 * | 8/2016 | Zwillinger | G01S 19/45 |
| 2003/0150903 A1 | 8/2003 | Hanna | |
| 2017/0011333 A1 * | 1/2017 | Greiner | G06Q 10/083 |
| 2017/0073139 A1 | 3/2017 | Tsuyuki et al. | |

OTHER PUBLICATIONS

U.S. Appl. No. 15/717,484, "Notice of Allowance", dated Jul. 1, 2019, 7 pages.
U.S. Appl. No. 15/717,484, "Restriction Requirement", dated Nov. 1, 2018, 7 pages.
PCT/US2018/052619, "International Search Report and Written Opinion", dated Dec. 19, 2018, 11 pages.
Application No. EP18786553.0, Office Action, dated Mar. 1, 2021, 7 pages.

* cited by examiner

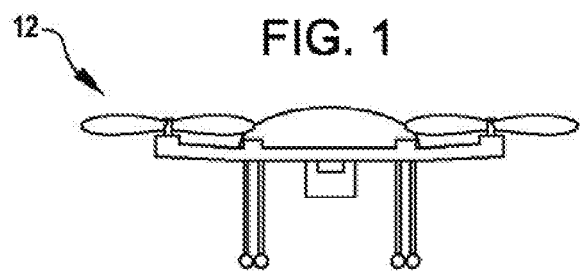
FIG. 1
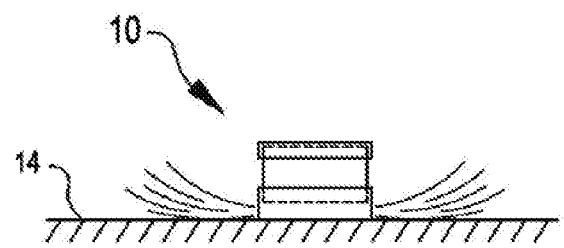
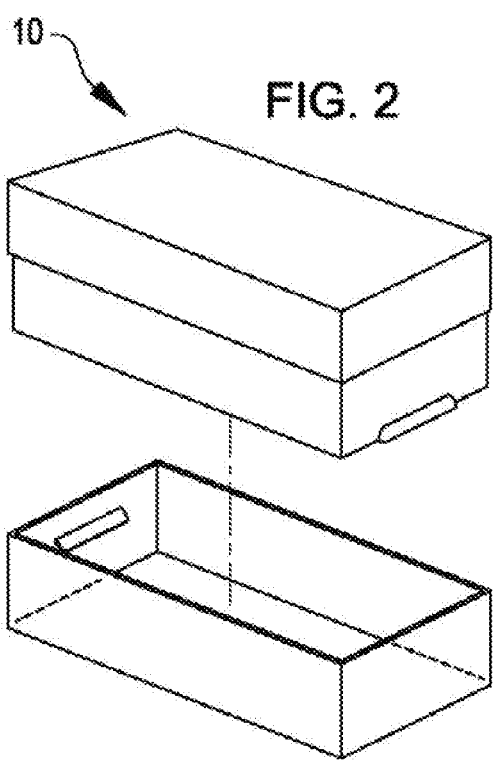
FIG. 2

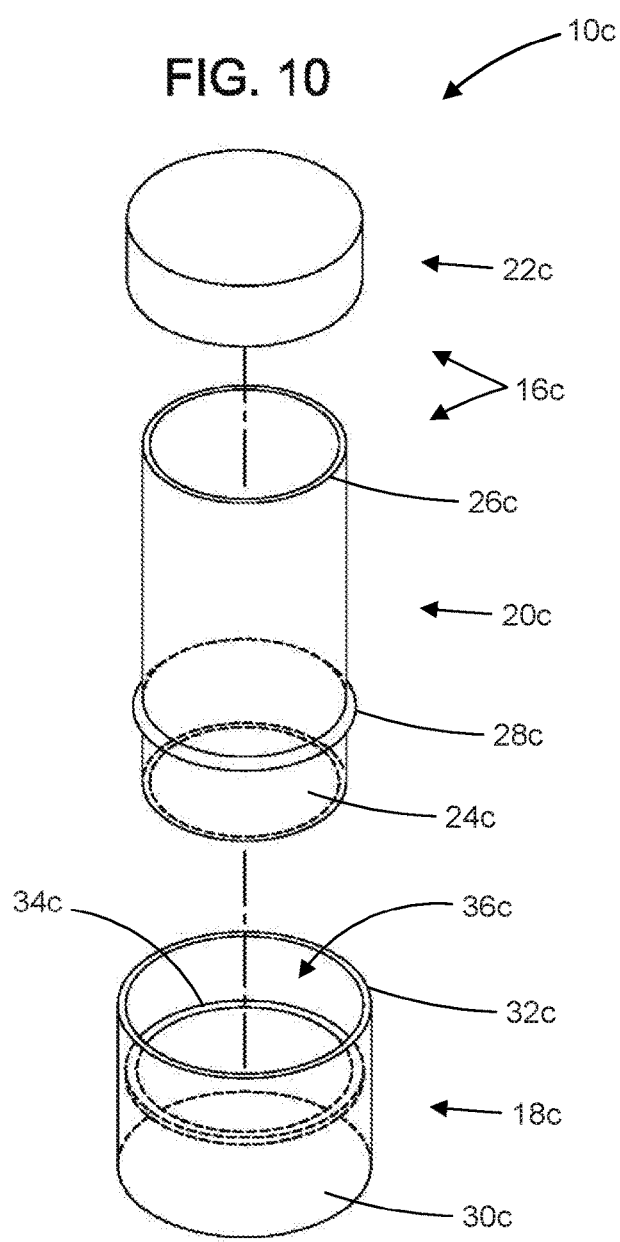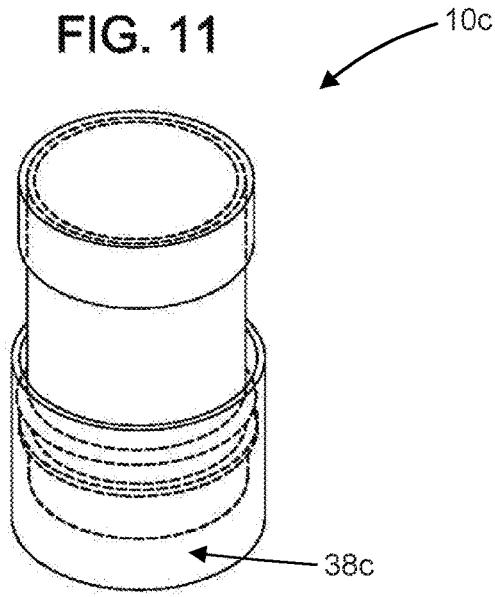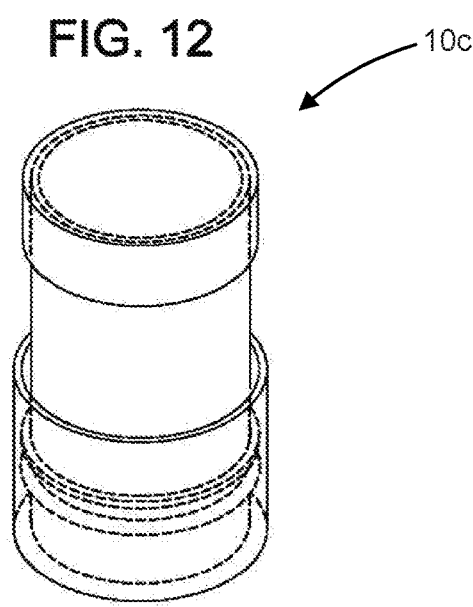

PISTON BOX

CROSS REFERENCE TO RELATED APPLICATIONS

This application is a divisional of U.S. application Ser. No. 15/717,484, filed Sep. 27, 2017 and titled "PISTON BOX", the contents of which are herein incorporated in its entirety.

BACKGROUND

Conventional methods of packaging and shipping a purchased item typically involve packaging the item into a shipping container. To minimize the likelihood of damage to the item, the item can be packaged using packing materials such as plastic bubble wrap, foam peanuts, and other similar materials.

BRIEF DESCRIPTION OF THE DRAWINGS

Various embodiments in accordance with the present disclosure will be described with reference to the drawings, in which:

FIG. 1 illustrates delivery of an item contained within a shock absorbing package, in accordance with some embodiments, dropped from an unmanned aerial vehicle;

FIG. 2 illustrates a shock absorbing package, in accordance with some embodiments;

FIG. 10 is an exploded view of a cylindrical shock absorbing package with frangible tabs, in accordance with some embodiments;

FIG. 11 is a view of the cylindrical shock absorbing package of FIG. 10 in a transport configuration;

FIG. 12 is a view of the cylindrical shock absorbing package of FIG. 10 in a post-impact configuration.

DETAILED DESCRIPTION

Figure 3:
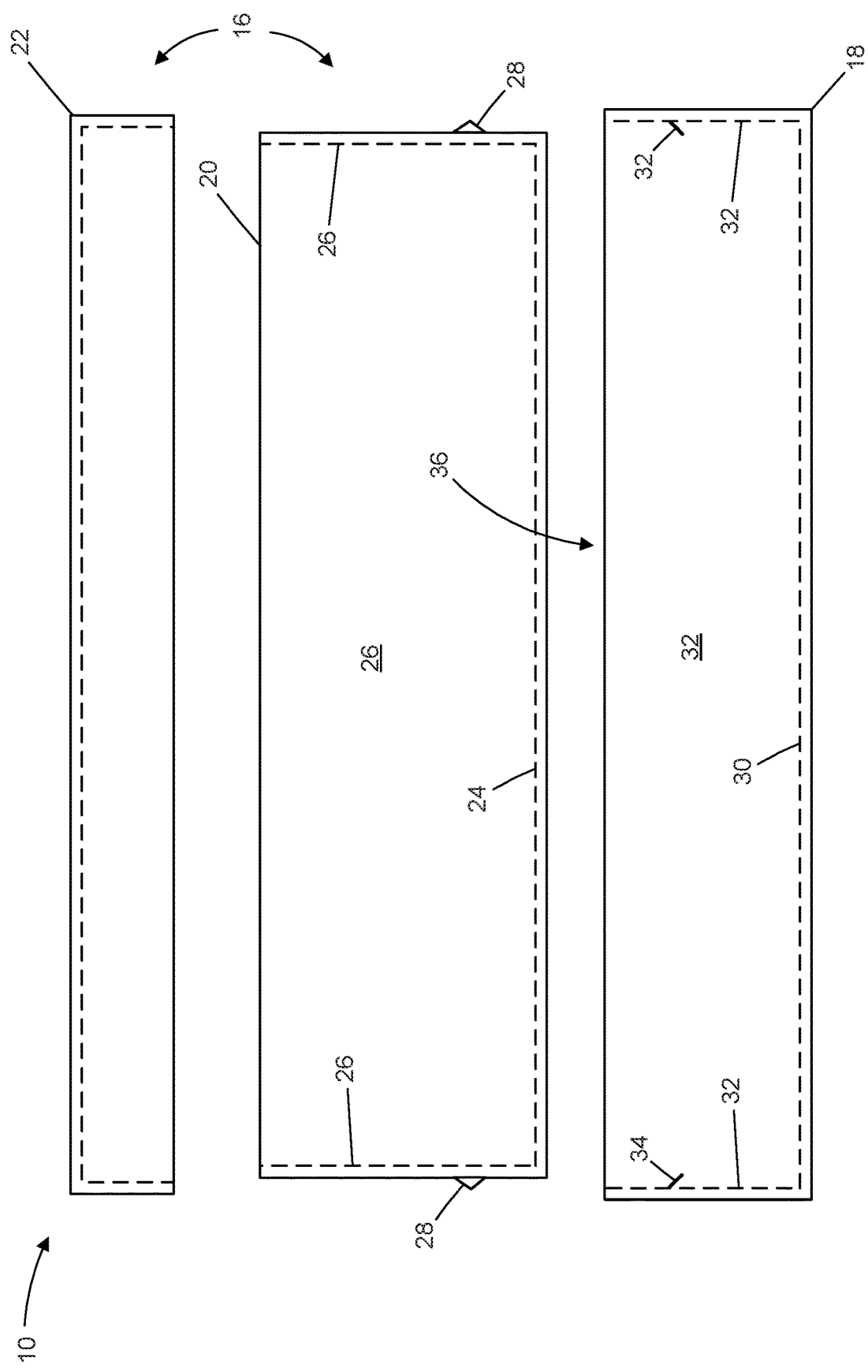
FIG. 3 is an exploded side view of a shock absorbing package, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments described herein relate to a shock-absorbing package that can be used to deliver an item via an unmanned aerial vehicle. In many embodiments, the shock-absorbing package includes a box and a base. The box is configurable to enclose the item to be delivered. The base forms a base recess. The shock-absorbing package has a transport configuration in which the box is coupled with the base so that a portion of the box is disposed within the base recess and a bottom panel of the box is held separated from a bottom panel of the base, thereby disposing a volume of air between the bottom panel of the box and the bottom panel of the base. The box and base bottom panels remain separated until an impact force applied to the base is generated by dropping the shock-absorbing package onto a surface from a height. The impact force applied to the base generates movement between the box and base that expels air from the volume of air separating the box and base bottom panels. In some embodiments, the shock-absorbing package is configured to inhibit the expulsion of the air sufficiently to generate a transient increase in the pressure of the volume of air between the box and base bottom panels. The transient increase in pressure of the volume of air helps to decelerate the box, thereby limiting impact forces experienced by the item enclosed in the box. In some embodiments, the box and base bottom panels are separated by greater than 2 inches and the pressure of the volume of air increases by at least 1 psi. The shock-absorbing package can also include an air vent that is adjustable to change the resistance to the expulsion of air from the volume of air disposed between the box and the base bottom panels. In some embodiments, the movement between the box and the base generates a frictional force that decelerates the box or helps decelerate the box in conjunction with a transient increase in the pressure of the volume of air between the box and the base bottom panels generated via the relative movement between the box and the base.

The shock-absorbing packages described herein can be used in conjunction with an electronic marketplace for delivering purchased items via unmanned aerial vehicles. In many embodiments, a shock-absorbing package is used in place of a conventional shipping container to limit deceleration levels experienced by an item when the package containing the item is dropped from a height (e.g., 10 feet or more) onto a surface. In some embodiments, the shock-absorbing package can be recycled or reused to deliver additional items. For example, a user who receives an item packaged in a shock-absorbing package may use the same shock-absorbing package to return the item to the sender. Once the shock-absorbing package is received from the user, the sender may recycle the shock-absorbing package or reuse the shock-absorbing package to deliver another item.

Turning now to the drawings, in which the same reference numbers refer to the same elements in the various figures, FIG. 1 illustrates delivery of an item contained within a shock-absorbing package 10 dropped from an unmanned aerial vehicle 12. When released by the aerial vehicle 12, the shock-absorbing package 10 falls and contacts a deliver location surface 14 thereby generating an impact force applied to the shock-absorbing package 10. The shock-absorbing package 10 is configured so that the impact force is applied to the shock-absorbing package 10 over a greater period of time than would occur in the case of a conventional package, thereby reducing the maximum deceleration level experienced by an item enclosed in the shock-absorbing package 10 relative to if the item was enclosed in a conventional package. In some embodiments, the shock-absorbing package is configured to limit the maximum deceleration level experienced by the item to 100 g or less.

FIGS. 2 and 3 illustrates an embodiment of the shock-absorbing package 10. In the illustrated embodiment, the package 10 includes a box 16 and a base 18. In many embodiments, the box 16 is configured similar to conventional boxes and is configurable to enclose an item to be delivered within the box 16. In the illustrated embodiment, the box 16 includes a bottom 20 and a top 22. The bottom 20 includes a bottom panel 24, four sides 26 extending upward from the bottom panel 24, and a pair of detent features 28 disposed on opposing sides 24. The base 18 includes a base bottom panel 30, four sides 32 extending transverse to the base bottom panel 30, and a pair of detent feature 34. The base bottom panel 30 and the four sides 32 define a base recess 36 sized to accommodate a portion of the box 16 including the box bottom panel 24 and limited portions of the four sides 26.

Figure 4:
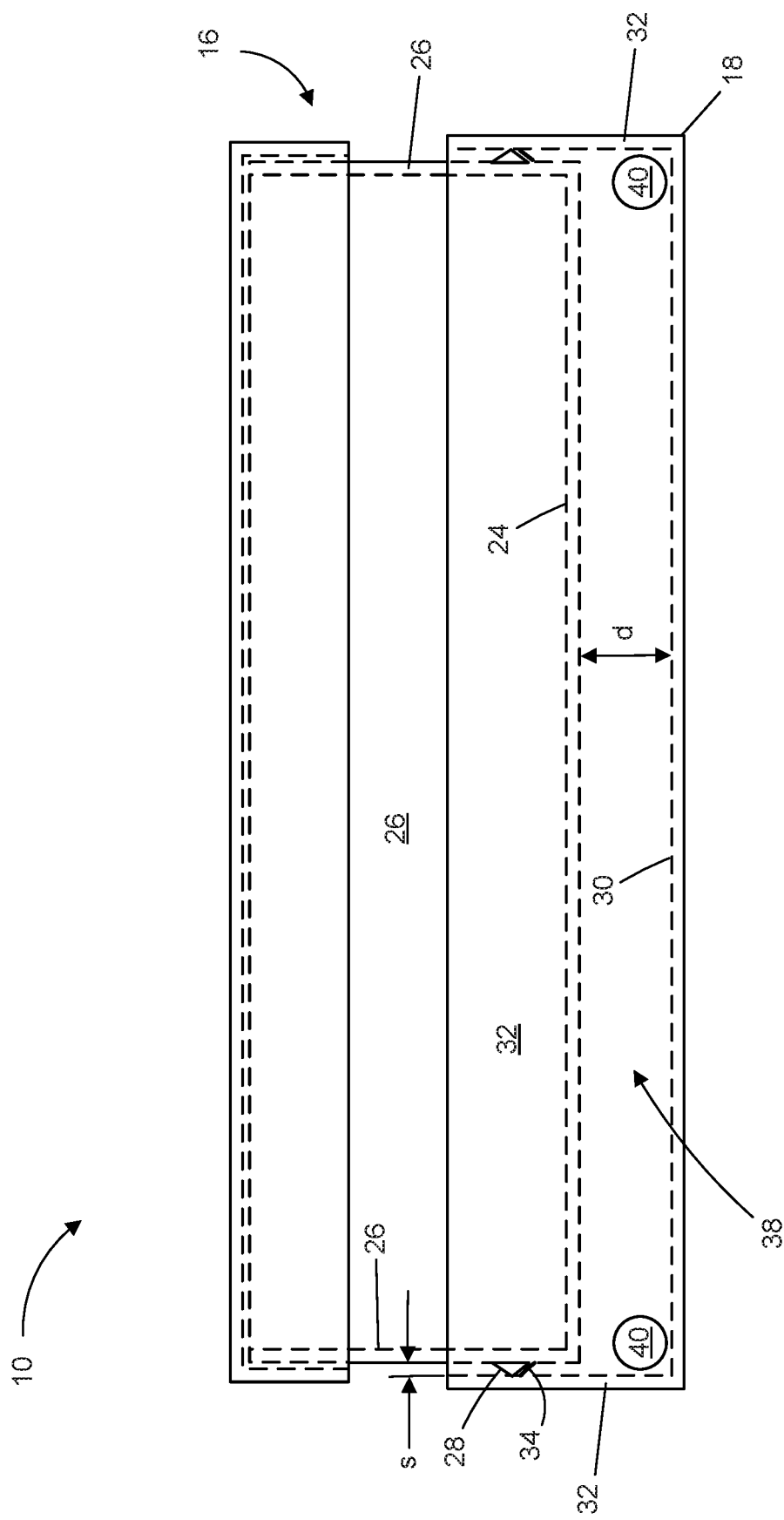
FIG. 4 is a side view of the shock absorbing package of FIG. 3 in a transport configuration.

FIG. 4 is a side view of the shock absorbing package 10 in a transport configuration. In the transport configuration, a portion of the box 16 is accommodated in the recess 36 and the detent features 28, 34 are interfaced so that the box bottom panel 24 is held separated from the base bottom panel 30 by a suitable distance (d) (e.g., at least 1.0 inch, at least 2.0 inch) and a volume of air 38 is disposed between the base bottom panel 30 and the box bottom panel 24. In many embodiments, each of the four sides 26 of the box bottom 20 are either interfaced with or held separated from a respective side 32 of the base 18 by a suitable distance (s) to inhibit expulsion of air from the volume of air 38 sufficient to generate a desired transient increase in pressure in the volume of air 38 (e.g., at least 1.0 psi, at least 2.0 psi) when the impact force is applied to the base 18 via the contact with the base 18 with the ground 14. In some embodiments, the shock-absorbing package 10 includes one or more air vents 40 that can be adjusted to change resistance to expulsion of air from the volume of air 38.

Figure 5:
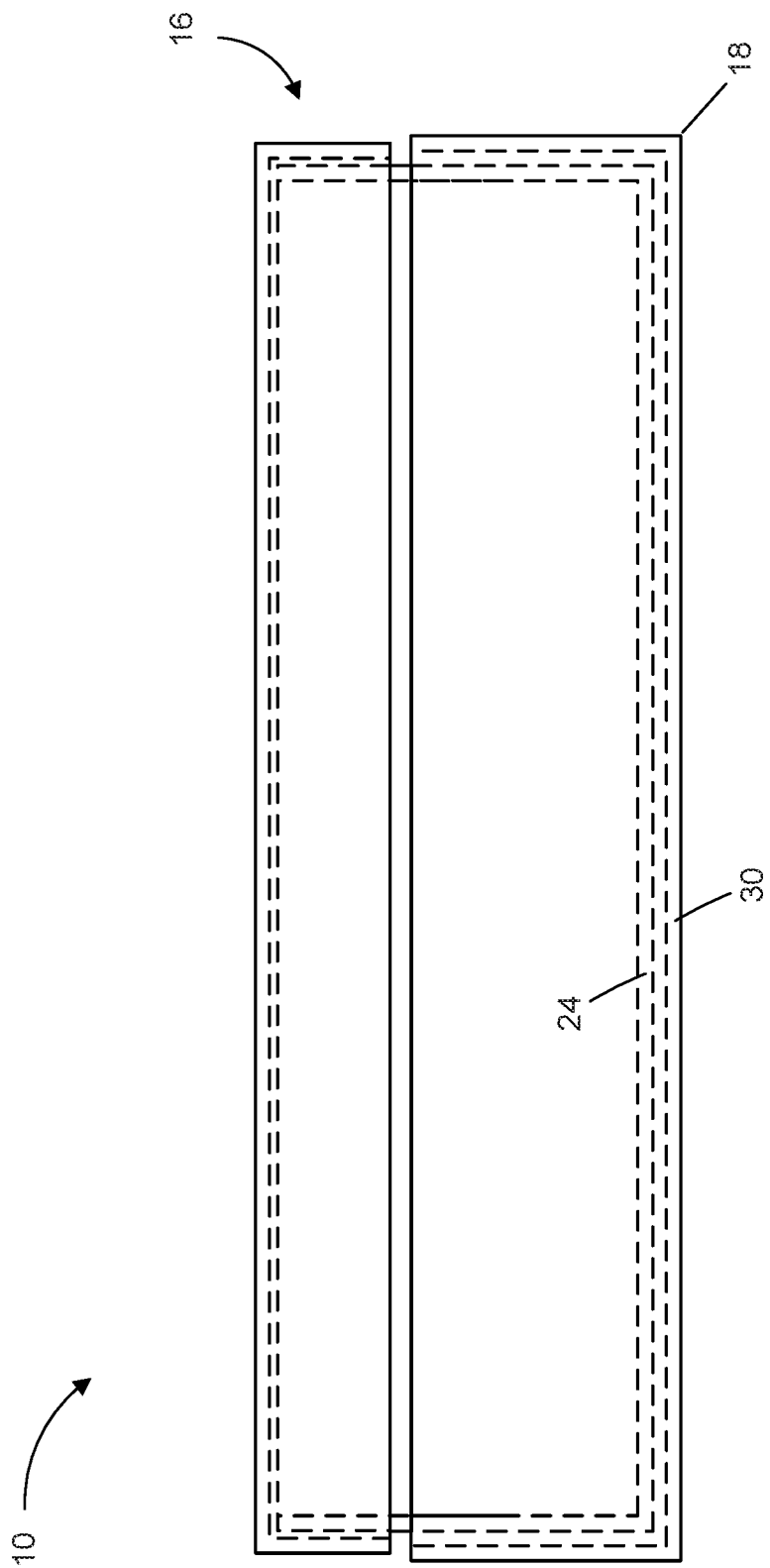
FIG. 5 is a side view of the shock absorbing package of FIG. 3 in a post-impact configuration.

FIG. 5 is a side view of the shock absorbing package 10 in a post-impact configuration. In many embodiments, the impact of the shock-absorbing package 10 with the delivery location surface 14 induces relative movement between the box 16 and the base 18 that expels air from the volume of air 38 and generates a transient increase in a pressure of the volume of air 38 that decelerates the box 16 at a rate less than a desired maximum deceleration rate (e.g., 100 g's). In the illustrated post-impact configuration, the box bottom panel 24 is disposed in contact with or is in close proximity with the base bottom panel 30, thereby enclosing a significantly smaller volume of air between the box bottom panel 24 and the base bottom panel 30 relative to the volume of air 38 in the transport configuration.

Figure 6:
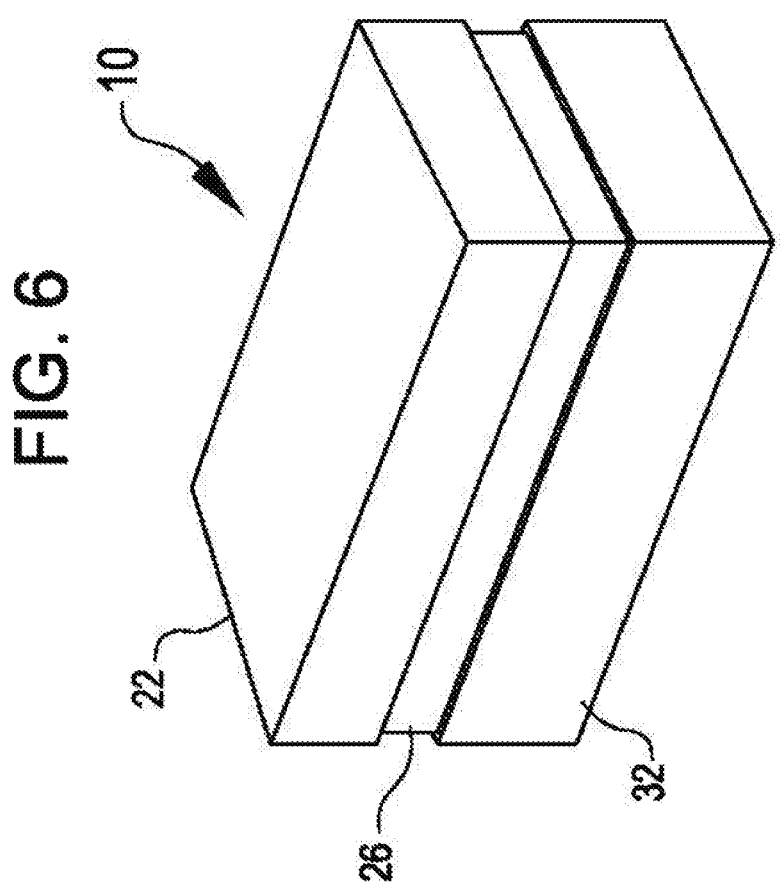
FIG. 6 illustrates the shock absorbing package of FIG. 2 in a transport configuration.

FIG. 6 illustrates the shock-absorbing package 10 of FIG. 2 in the transport configuration. In the illustrated embodiment, the box side panels 26 have a color that differs from the color of the box top 22 and the base sidewalls 32, thereby enabling easy visual confirmation of whether the shock-absorbing package 10 is in the transport configuration based on how much of the box side panels 26 are visible.

Figure 7:
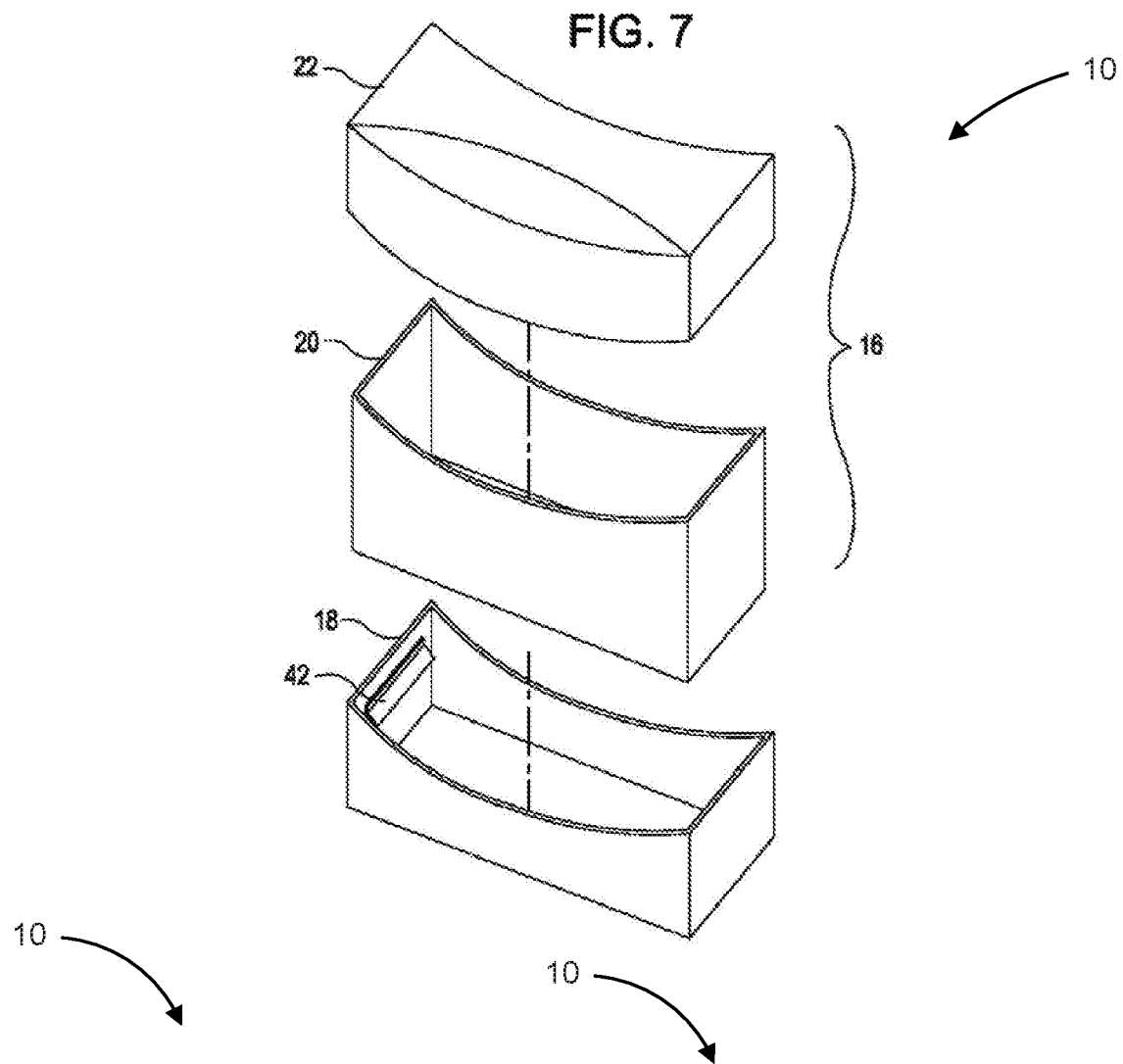
FIG. 7 is an exploded side view of a shock absorbing package with frangible tabs, in accordance with some embodiments.
Figure 8:
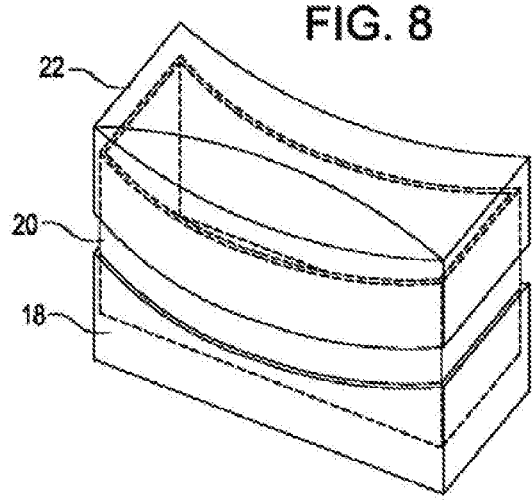
FIG. 8 is a side view of the shock absorbing package of FIG. 7 in a transport configuration.
Figure 9:
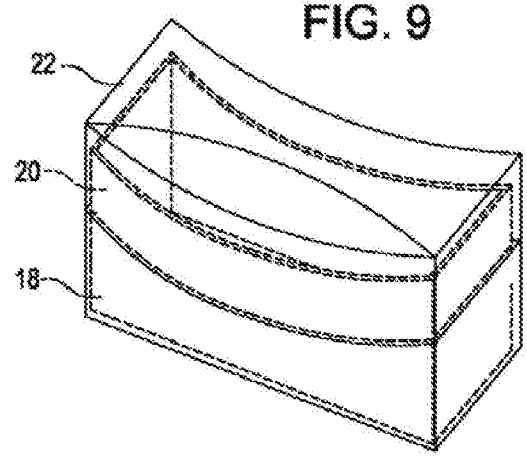
FIG. 9 is a side view of the shock absorbing package of FIG. 7 in a post-impact configuration.

FIG. 7 is an exploded side view of an embodiment of the shock absorbing package 10, in accordance with some embodiments. In the illustrated embodiment, the base 18 includes a pair of frangible tabs 42 configured to interface with the box bottom 20 to hold the box 16 in the transport configuration in a fixed position relative to the base 18. Upon contact of the base 18 with the delivery surface location 14, a force is applied to the frangible tabs 42 by the box 16 sufficient to break the frangible tabs 42 thereby accommodating the relative movement between the box 16 and the base 18 that expels the air from the volume of air 38 and reconfigures the shock-absorbing package 10 from the transport configuration to the post-impact configuration. FIG. 8 is a side view of the shock absorbing package 10 of FIG. 7 in a transport configuration. FIG. 9 is a side view of the shock absorbing package 10 of FIG. 7 in a post-impact configuration.

FIG. 10 shows an exploded view of an embodiment of a cylindrical shock-absorbing package 10c. In the illustrated embodiment, the package 10c includes a cylindrical box 16c and a cylindrical base 18c. In many embodiments, the box 16c is configured similar to conventional boxes and is configurable to enclose an item to be delivered within the box 16c. In the illustrated embodiment, the box 16c includes a bottom 20c and a top 22c. The bottom 20c includes a bottom panel 24c, a cylindrical side wall 26c extending upward from the bottom panel 24c, and a detent feature 28c disposed on the cylindrical side wall 26c. The base 18c includes a base bottom panel 30c, a cylindrical side wall 32 extending transverse to the base bottom panel 30c, and a detent feature 34c. The base bottom panel 30c and the side wall 32c define a base recess 36c sized to accommodate a portion of the box 16c including the box bottom panel 24c and limited portions of the sidewall 26c.

FIG. 11 shows a view of the cylindrical shock absorbing package 10c in a transport configuration. In the transport configuration, a portion of the box 16c is accommodated in the recess 36c and the detent features 28c, 34c are interfaced so that the box bottom panel 24c is held separated from the base bottom panel 30c by a suitable distance (d) (e.g., at least 1.0 inch, at least 2.0 inch) and a volume of air 38c is disposed between the base bottom panel 30c and the box bottom panel 24c. In many embodiments, the sidewall 26c of the box bottom 20c are either interfaced with or held separated from the sidewall 32c of the base 18c by a suitable distance (s) to inhibit expulsion of air from the volume of air 38c sufficient to generate a desired transient increase in pressure in the volume of air 38c (e.g., at least 1.0 psi, at least 2.0 psi) when the impact force is applied to the base 18c via the contact with the base 18c with the ground 14. In some embodiments, the shock-absorbing package 10c includes one or more air vents (such as the air vents 40 shown in FIG. 4) that can be adjusted to change resistance to expulsion of air from the volume of air 38C.

FIG. 12 shows a view of the shock absorbing package 10c in a post-impact configuration. In many embodiments, the impact of the shock-absorbing package 10c with the delivery location surface 14 induces relative movement between the box 16c and the base 18c that expels air from the volume of air 38c and generates a transient increase in a pressure of the volume of air 38c that decelerates the box 16c at a rate less than a desired maximum deceleration rate (e.g., 100 g's). In the illustrated post-impact configuration, the box bottom panel 24c is disposed in contact with or is in close proximity with the base bottom panel 30c, thereby enclosing a significantly smaller volume of air between the box bottom panel 24c and the base bottom panel 30c relative to the volume of air 38c in the transport configuration.

Figure 13:
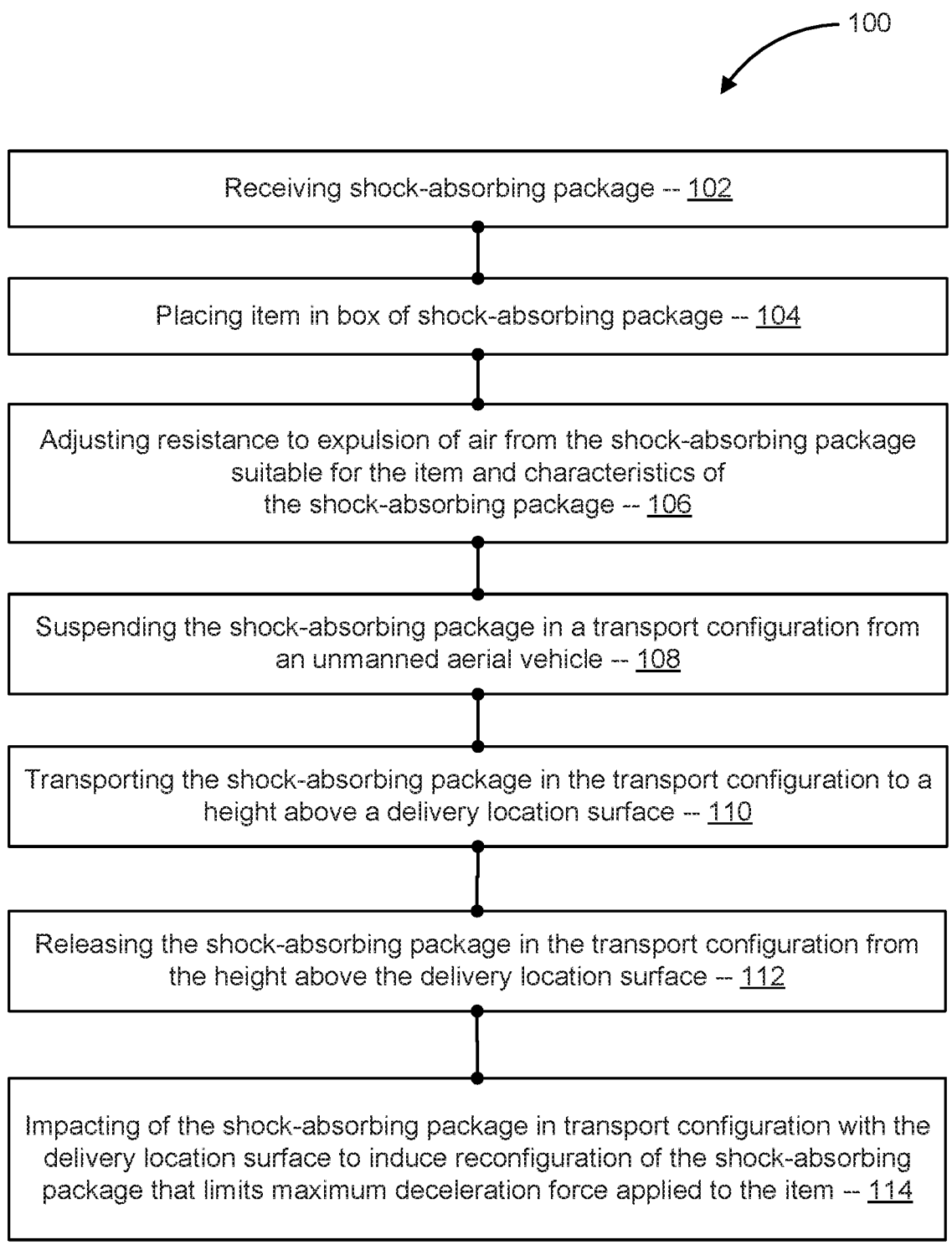
FIG. 13 is a simplified schematic diagram of a method of delivering an item in a shock-absorbing package, in accordance with some embodiments.

FIG. 13 is a simplified schematic diagram of a method 100 of delivering an item in a shock-absorbing package, in accordance with some embodiments. Any suitable shock-absorbing package can be employed in the practice of the method 100 including the shock-absorbing packages described herein. The method 100 includes receiving a shock-absorbing package (act 102), placing an item in the shock-absorbing package (act 104), optionally adjusting a resistance to expulsion of air from the shock-absorbing package suitable for the item and characteristics of the shock-absorbing package (act 106), suspending the shock-absorbing package in a transport configuration from an unmanned aerial vehicle (act 108), transporting the shock-absorbing package in the transport configuration to a height above a delivery location surface (act 110), releasing the shock-absorbing package in the transport configuration from the height above the delivery location surface (act 112), and impacting the shock-absorbing package in the transport configuration with the delivery surface location to induce reconfiguration of the shock-absorbing package from the transport configuration to a post-impact configuration so as to limit maximum deceleration force applied to the item (act 114).

Some or all of the method 100 (or any other methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method delivering an item, the method comprising:
    receiving a shock-absorbing package comprising a box and a base, wherein the box comprises a box bottom panel, wherein the base comprises a base bottom panel and one or more base sidewalls extending transverse to the base bottom panel, wherein the base bottom panel and the one or more base sidewalls define a recess sized to accommodate a portion of the box including the box bottom panel, wherein the shock-absorbing package is configurable in a transport configuration in which the portion of the box is accommodated in the recess and the box and the base are interfaced so that the box bottom panel is held separated from the base bottom panel by at least 1.0 inch via detent features that secure a position of the box relative to the base, and a volume of air is disposed between the base bottom panel and the box bottom panel, wherein the detent features comprise:
        frangible tabs that break to accommodate relative movement between the box and the base, or
        a tab and a slot shaped to accommodate the tab to secure the position of the box relative to the base in the transport configuration and accommodate movement of the tab relative to the slot during the relative movement between the box and the base;
    placing the item into the box;
    suspending the shock-absorbing package in the transport configuration from an unmanned aerial vehicle;
    transporting the shock-absorbing package suspended in the transport configuration from the unmanned aerial vehicle to above a delivery location surface; and
    releasing the shock-absorbing package from the unmanned aerial vehicle so that:
        the shock-absorbing package falls from above the delivery location surface and impacts the delivery location surface in the transport configuration; and
        the impact of the shock-absorbing package with the delivery location surface induces relative movement between the box and the base that expels air from the volume air and decelerates the box.

2. The method of claim 1, wherein the box bottom panel is separated from the base bottom panel by at least two inches in the transport configuration.

3. The method of claim 1, wherein the relative movement between the box and the base generates a transient increase in a pressure of the volume of air of at least 1.0 psi.

4. The method of claim 1, wherein the detent features comprise the frangible tabs.

5. The method of claim 1, wherein the shock-absorbing package is released from the unmanned aerial vehicle at least 10.0 feet above the delivery location surface.

6. The method of claim 1, further comprising reconfiguring the shock-absorbing package to change a resistance to expulsion of air from the volume of air.

7. The method of claim 6, wherein the shock-absorbing package comprises an air vent that is adjusted to change the resistance to expulsion of air from the volume of air.

8. The method of claim 1, wherein the detent features comprise the tab and the slot.

9. The method of claim 1, wherein the one or more base sidewalls comprise a sidewall having a cylindrical shape.

10. A method delivering an item, the method comprising:
placing the item into a box of a shock-absorbing package comprising the box and a base, wherein the box comprises a box bottom panel, wherein the base comprises a base bottom panel and one or more base sidewalls extending transverse to the base bottom panel, wherein the base bottom panel and the one or more base sidewalls define a recess sized to accommodate a portion of the box including the box bottom panel, wherein the shock-absorbing package is configurable in a transport configuration in which the portion of the box is accommodated in the recess and the box and the base are interfaced so that the box bottom panel is held separated from the base bottom panel by at least 1.0 inch, and a volume of air is disposed between the base bottom panel and the box bottom panel, wherein the shock-absorbing package comprises detent features that secure a position of the box relative to the base in the transport configuration, and wherein the detent features comprise:

frangible tabs that break to accommodate relative movement between the box and the base, or a tab and a slot shaped to accommodate the tab to secure the position of the box relative to the base in the transport configuration and accommodate movement of the tab relative to the slot during the relative movement between the box and the base;

adjusting an air vent of the shock-absorbing package to adjust a resistance to expulsion of air from the volume of air disposed between the base bottom panel and the box bottom panel;

suspending the shock-absorbing package in the transport configuration from an unmanned aerial vehicle;

transporting the shock-absorbing package suspended in the transport configuration from the unmanned aerial vehicle to above a delivery location surface; and releasing the shock-absorbing package from the unmanned aerial vehicle so that:

the shock-absorbing package impacts the delivery location surface in the transport configuration; and the impact of the shock-absorbing package with the delivery location surface induces relative movement between the box and the base that expels air from the volume air and decelerates the box.

11. The method of claim 10, wherein the box bottom panel is separated from the base bottom panel by at least 2.0 inches in the transport configuration.

12. The method of claim 10, wherein the relative movement between the box and the base generates a transient increase in a pressure of the volume of air of at least 1.0 psi.

13. The method of claim 10, wherein the detent features comprise the frangible tabs.

14. The method of claim 10, wherein the detent features comprise the tab and the slot.

15. The method of claim 10, wherein the shock-absorbing package is released from the unmanned aerial vehicle at least 10.0 feet above the delivery location surface.

16. The method of claim 10, wherein the one or more base sidewalls comprise a sidewall having a cylindrical shape.

* * * * *